(12) United States Patent
Sadasue et al.

(10) Patent No.: US 8,295,618 B2
(45) Date of Patent: Oct. 23, 2012

(54) IMAGE PROCESSING APPARATUS, IMAGE PROCESSING METHOD, AND COMPUTER PROGRAM PRODUCT

(75) Inventors: Tamon Sadasue, Tokyo (JP); Akio Matsubara, Kanagawa (JP); Hiroyuki Sakuyama, Tokyo (JP); Koji Kobayashi, Kanagawa (JP); Junichi Hara, Kanagawa (JP); Taku Kodama, Kanagawa (JP); Maiko Takenaka, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 671 days.

(21) Appl. No.: 12/507,984

(22) Filed: Jul. 23, 2009

(65) Prior Publication Data

US 2010/0034473 A1    Feb. 11, 2010

(30) Foreign Application Priority Data

Aug. 6, 2008 (JP) ................. 2008-203336

(51) Int. Cl.
G06K 9/36 (2006.01)
(52) U.S. Cl. ...................................................... 382/232
(58) Field of Classification Search .................. 382/232, 382/236–240, 248–251; 358/3.06, 3.13; 348/394.1–395.1, 400.1–416.1, 420.1–421.1, 348/424.2, 430.1–431.1; 375/240.02–240.03, 375/240.12–240.2, 240.24–240.25
See application file for complete search history.

(56) References Cited

U.S. PATENT DOCUMENTS 6,104,434 A * 8/2000 Nakagawa et al. ...... 375/240.16
7,221,483 B2 * 5/2007 Yagishita et al. ............ 358/3.13
2009/0077168 A1    3/2009 Sadasue
2009/0119583 A1    5/2009 Kihara et al.

FOREIGN PATENT DOCUMENTS

| JP | 9-261632 | 10/1997 |
|---|---|---|
| JP | 11-285006 | 10/1999 |
| JP | 2002-271790 | 9/2002 |
| JP | 2004-274760 | 9/2004 |
| JP | 2006-86579 | 3/2006 |
| JP | 2006-197573 | 7/2006 |
| WO | WO 2007/021613 A2 | 2/2007 |

OTHER PUBLICATIONS

"JPEG 2000 Part 1 020719 (Final Publication Draft)", ISO/IEC JTC1/SC29 WG1, JPEG 2000, Editor Martin Boliek et al., Revised Jul. 19, 2002, 245 pages.
Gary J. Sullivan, et al., "Text of ISO/IEC FCD 29199-2 (JPEG XR image coding—Specification)", Sep. 14, 2008, 174 pages.
Japan Office Action issued Mar. 21, 2012, in Japan Patent Application No. 2008-203336.

* cited by examiner

*Primary Examiner* — Jose Couso
(74) *Attorney, Agent, or Firm* — Oblon, Spivak, McClelland, Maier & Neustadt, L.L.P.

(57) ABSTRACT

In an image processing apparatus, an encoding unit encodes a processed image; a determining unit determines whether a reference pixel has been subjected to the image processing; and a decoding unit decodes, when the determining unit determines that the reference pixel has been subjected to the image processing, a piece of rectangular block code data of a rectangular block thereby acquiring a second decoded image. The encoding unit refers to, when the determining unit determines that the reference pixel has been subjected to the image processing, the processed image and encodes the second decoded image.

6 Claims, 9 Drawing Sheets

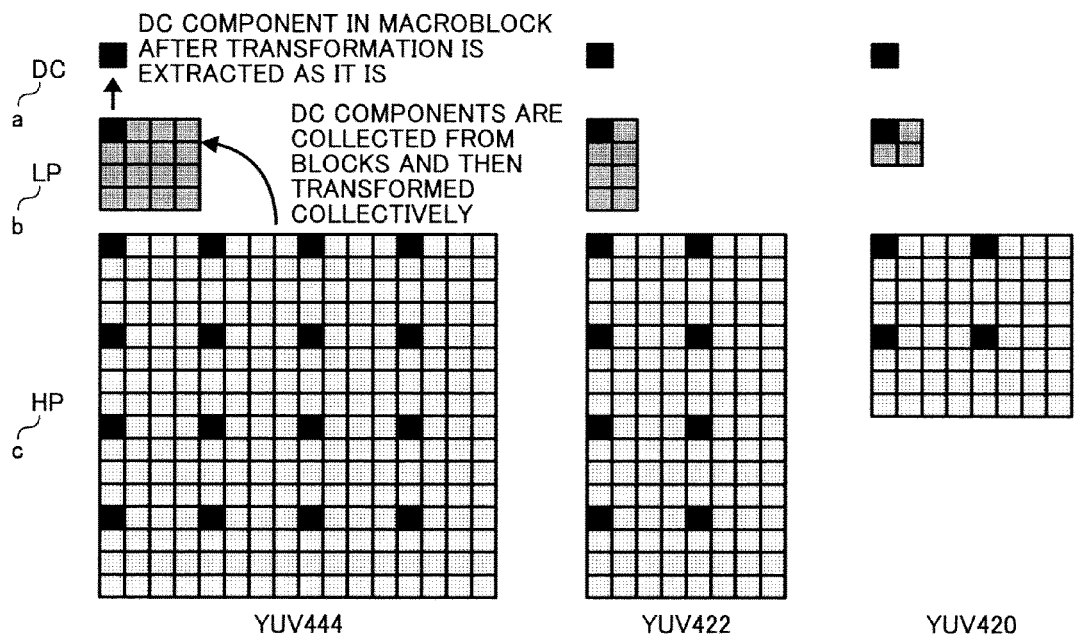

AREA WITHOUT
EDGES OF IMAGE

TOP EDGE OF
IMAGE

LEFT EDGE
OF IMAGE

RIGHT EDGE
OF IMAGE

BOTTOM EDGE
OF IMAGE

DC(L)

DC(T)

DC(T)+DC(L)>>1

NO PREDICTION

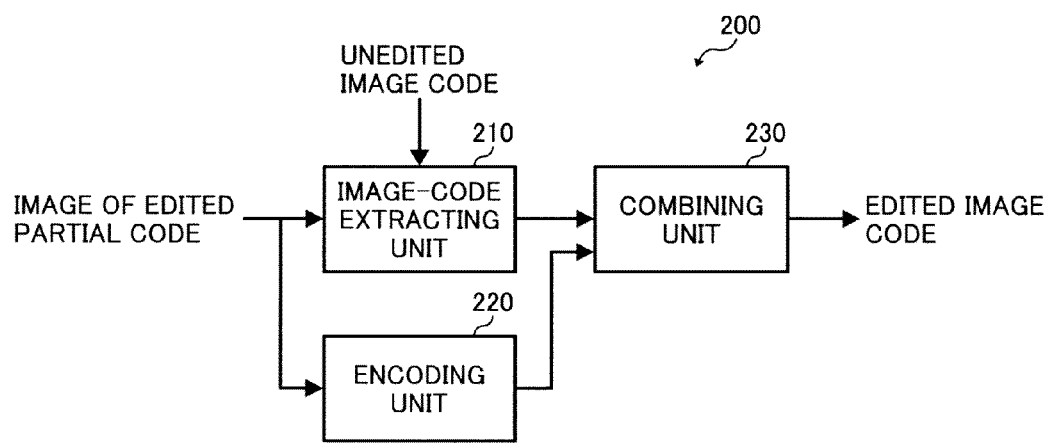

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2008-203336 filed in Japan on Aug. 6, 2008.

BACKGROUND OF THE INVENTION

1. Field of the Invention

The present invention relates to a technology for encoding an image in an image processing apparatus.

2. Description of the Related Art

In recent years, there has been proposed a technology for reducing memory consumption when encoding an image so that an encoding apparatus can be made simpler. More particularly, an image to be encoded is divided into a plurality of rectangular blocks and then encoding is performed with respect to each rectangular block. With this technology, processing such as decoding and editing can be performed with respect to each piece of code data corresponding to each rectangular block which leads to reduction in memory consumption.

However, division of the image into the rectangular block leads to generation of noise such as block-noise. A digital camera having a measure for such a problem is disclosed in, for example, Japanese Patent Application Laid-open No. 2002-271790. In this technology, a user is allowed to determine the boundaries of the rectangular blocks upon dividing an image into the rectangular blocks so that the user can control a position of image discontinuity in the decoded image of the rectangular blocks as desired.

Meanwhile, when an image is to be decoded and edited with respect to each code data corresponding to each rectangular block, there may be a case that code data corresponding to a rectangular block other than a rectangular block being processed or code data corresponding to the entire image needs to be updated depending on the contents of editing. In this case, if the code data of the entire image is decoded and then re-encoded, costs for the decoding and the re-encoding increase.

For example, Japanese Patent Application Laid-open No. 2006-86579 discloses an image processing apparatus having a measure for such a problem. Specifically, the image processing apparatus is configured such that a code amount of code data corresponding to a rectangular block obtained after the editing will be equal to a code amount of code data corresponding to the rectangular block before the editing. As a result, updating of information about the code amount of code data corresponding to a rectangular block other than the rectangular block being processed or the code amount of code data corresponding to the entire image can be omitted.

However, the technologies disclosed in Japanese Patent Application Laid-open No. 2002-27190 and Japanese Patent Application Laid-open No. 2006-86579 do not take into account a case where a reference relation exists among a plurality of rectangular blocks. More particularly, when image data of a rectangular block adjacent to a rectangular block to be processed (hereinafter, "target rectangular block") is used for performing filtering process for removing noise, or when the target rectangular block is encoded by performing predictive coding between rectangular blocks with regard to transform coefficients obtained through orthogonal transform performed on the rectangular blocks, and if image data of the target rectangular block is changed, a rectangular block that refers to the target rectangular block also needs to be re-encoded.

If editing is performed without taking the reference relation into account, re-encoding needs to be performed to decode the entire image, editing needs to be performed on the entire image, and then the entire image needs to be re-encoded. However, this process reduces the advantage of performing encoding with respect to each rectangular block and generating code data for each rectangular block.

SUMMARY OF THE INVENTION

It is an object of the present invention to at least partially solve the problems in the conventional technology.

According to an aspect of the present invention, there is provided an image processing apparatus that processes image code data of image data, the image code data containing a plurality of pieces of rectangular block code data each being generated as a result of dividing the image data into a plurality of rectangular blocks and performing encoding with respect to each rectangular block by reference to image data of a neighboring rectangular block of each of the rectangular blocks. The image processing apparatus includes an encoding unit configured to encode a processed image that is obtained by performing image processing on a first decoded image that is obtained by decoding one of the pieces of the rectangular block code data; a determining unit configured to determine whether a reference pixel has been subjected to the image processing, the reference pixel having been referred to among pixels contained in the first decoded image when image data of a rectangular block adjacent to the first decoded image has been subjected to the image processing; and a decoding unit configured to decode, when the determining unit determines that the reference pixel has been subjected to the image processing, a piece of the rectangular block code data of a rectangular block that has referred to the first decoded image thereby acquiring a second decoded image. The encoding unit refers to, when the determining unit determines that the reference pixel has been subjected to the image processing, the processed image and encodes the second decoded image.

According to another aspect of the present invention, there is provided an image processing method for processing image code data of image data, the image code data containing a plurality of pieces of rectangular block code data each being generated by dividing the image data into a plurality of rectangular blocks and performing encoding with respect to each rectangular block with reference to image data of a neighboring rectangular block of each of the rectangular blocks. The image processing method includes encoding a processed image that is obtained by performing image processing on a first decoded image that is obtained by decoding one of the pieces of the rectangular block code data; determining whether a reference pixel has been subjected to the image processing, the reference pixel having been referred to among pixels contained in the first decoded image when image data of a rectangular block adjacent to the first decoded image has been subjected to the image processing; and decoding, when it is determined at the determining that the reference pixel has been subjected to the image processing, a piece of the rectangular block code data of a rectangular block that has referred to the first decoded image thereby acquiring a second decoded image. The encoding includes referring, when it is determined at the determining that the reference pixel has been subjected to the image processing, the processed image and encoding the second decoded image.

According to still another aspect of the present invention, there is provided an computer program product comprising a computer-usable medium having computer-readable program codes embodied in the medium that when executed cause a computer to execute the above image processing method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic diagram for explaining a frequency hierarchy employed in JPEG XR;

FIGS. 4A and 4B are schematic diagrams for explaining processing in a coefficient reordering stage;

FIGS. 8A and 8B are schematic diagrams for explaining prediction modes for an LP coefficient;

FIG. 9 is a schematic diagram illustrating a configuration example of an image processing apparatus according to an embodiment of the present invention;

DETAILED DESCRIPTION OF THE PREFERRED EMBODIMENTS

Figure 1:
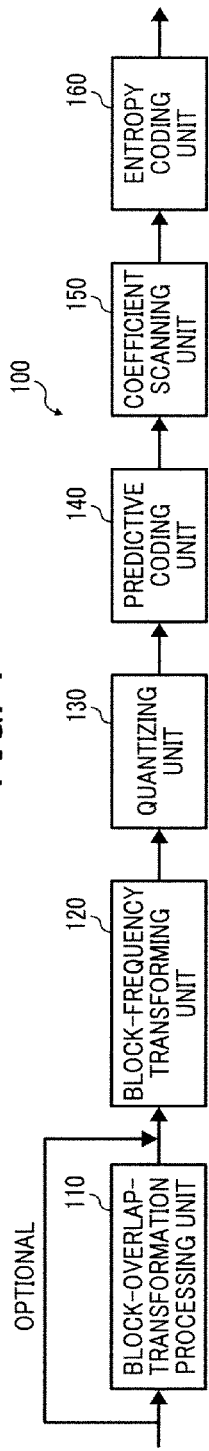
FIG. 1 is a block diagram of an image coding apparatus that implements a JPEG XR image coding system.

Exemplary embodiments of the present invention are explained in detail below with reference to the accompanying drawings.

An image coding method using JPEG XR or the like is described below before giving detailed explanation about the exemplary embodiments of the present invention.

In a conventional image processing apparatus or the like that is configured to store and display high-definition images or images having large image sizes, it is difficult to perform processing on such images by using only a single image code. The reasons being that an extremely large-capacity memory is necessary and a processing time for compressing and expanding the images becomes too long. Besides, in a server-client system, there is a problem that traffic volume largely increases.

To solve the above problems, in an image-code storing method such as a method using a FlashPix format, an image to be processed is divided into a plurality of images having different resolutions and appropriate image sizes when being stored. Furthermore, when the image is displayed, only a JPEG code related to a tile requested by a server is transmitted to a client by using a protocol called "IIP" designed for a FlashPix image, which leads to reduction in the traffic volume.

Meanwhile, with use of JPEG 2000 (see ISO/IEC 15444-1 (Information Technology JPEG 2000 Image Coding System)), JPEG XR (see ISO/IEC 29199-2 JPEG XR image coding specification (Committee Draft)), and the like, code data can be structured with hierarchical resolutions and a code in an arbitrary spatial domain can be extracted independently. Therefore, the same function as FlashPix can be achieved without generating an image file or a bitstream corresponding to each resolution or each spatial domain as has been done in FlashPix. Furthermore, a level of a signal corresponding to a high-resolution in an image is expressed as a difference with respect to a level of a signal corresponding to a low-resolution in the image. Therefore, unlike FlashPix, redundancy of resolution signals can be prevented.

In the JPEG coding system, an image is divided into blocks and then DCT transform and quantization are performed with respect to each block. In this scheme, however, distortion appears remarkably at a boundary between blocks at higher compression rate. On the other hand, in the JPEG XR system, overlap transform is performed across block boundaries before performing a frequency transform in each block, so that block distortion can largely be reduced.

Thus, with use of the coding system that enables code data to have a hierarchical structure, an image having an extremely large size can be stored. More particularly, when only a part of an image is edited and the rest of the image remains unchanged in a case where, for example, a large-sized image is generated by combining a plurality of images or a map image containing a large number of pixels is processed, and if image processing is performed in such a manner that the entire image is decoded, the decoded image is edited, and the edited image is re-encoded, a large amount of memory need to be assured during editing and a processing time for decoding and encoding largely increases despite the fact that only a part of the image is edited.

The embodiment of the present invention is applied to, for example, an image processing apparatus that performs a block overlap transform process (i.e., photo overlap transform (POT)) employed in the JPEG XR coding system.

The following description is made using an example in which only a 4:4:4 color format is used, in which the number of samples of the luminance component is the same as the number of samples of the chrominance component. However, similar technique can be applied to 4:2:2 and 4:1:1 color formats according to the same principle and with use of a corresponding block transform and a corresponding overlap transform.

FIG. 1 is a block diagram of an image coding apparatus 100 that implements the JPEG XR image coding system. In FIG. 1, each unit performs certain processing on input image data and outputs code data.

The image coding apparatus 100 includes a block-overlap-transformation processing unit 110, a block-frequency transforming unit 120, a quantizing unit 130, a predictive coding unit 140, a coefficient scanning unit 150, and an entropy coding unit 160.

The block-overlap-transformation processing unit 110 performs a POT across macroblock boundaries to prevent block noise. The block-frequency transforming unit 120 generates a three-level frequency hierarchy of a photo core transform (PCT).

The quantizing unit 130 performs a quantization of transform coefficients generated through the PCT. The predictive coding unit 140 performs predictive coding of the transform coefficients between macroblocks. The coefficient scanning unit 150 scans the transform coefficients that have been subjected to the predictive coding, with respect to each block to generate a one-dimensional sequence. The entropy coding unit 160 encodes the transform coefficients through run-level coding and adaptive variable length coding. The entropy coding unit 160 can also add header information and the like to each macroblock.

The code data in the JPEG XR coding system has, similar to code data in the JPEG 2000 coding system, a scalability, so that a piece of code data corresponding to one partial domain corresponding to one resolution can be extracted and decoded from pieces of code data. In the JPEG XR coding system, unlike in the JPEG 2000 coding system, the block overlap transform process is performed as preprocessing of a block frequency transform by using a block transform in which frequency transform is performed on each block obtained as a result of division of an image. Block distortion can be reduced by performing the block overlap transform process. There are three types of frequency bands in the JPEG XR coding system, which are generated after the block frequency transform is applied twice.

Figure 2:
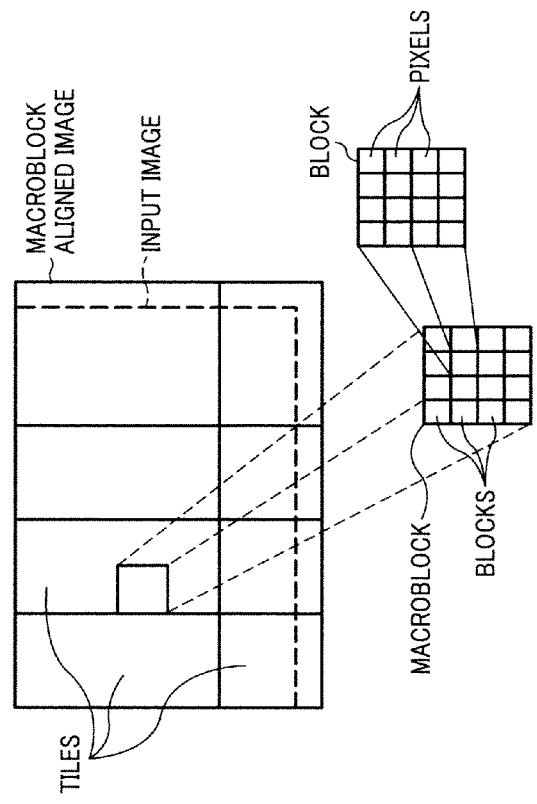
FIG. 2 is a schematic diagram for explaining a spatial hierarchy employed in JPEG XR.
Figure 5:
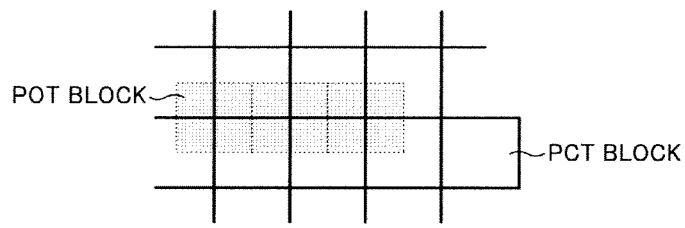
FIG. 5 is a schematic diagram for explaining an area to which a POT is applied within a tile.

FIG. 2 is a schematic diagram for explaining a spatial hierarchy employed in the JPEG XR coding system. As shown in FIG. 2, a collection of four vertical and four horizontal pixels (a minimum unit of an image), i.e., sixteen pixels in total (hereinafter, referred to as "4×4 pixels"), is defined as a block. A collection of 4×4 blocks is defined as a macroblock. A rectangular area formed of one or more macroblocks is defined as a tile. A boundary between the tiles coincides with a boundary between the macroblocks.

Thus, a tile is the largest unit into which an image can be divided. Encoding and decoding is performed independently with respect to each tile. More particularly, predictive coding or the like is not performed across a plurality of tile boundaries. The sizes of the tiles need not be uniform as long as horizontal widths of tiles in the same column and vertical widths of tiles in the same row are the same to one another.

FIG. 3 is a schematic diagram for explaining a frequency hierarchy employed in the JPEG XR coding system. In the JPEG XR coding system, a frequency hierarchy of three levels is employed. These three levels are a DC band "a", an LP (Low Pass) band "b", and an HP (High Pass) band "c" in order of low frequency. The transform coefficient of those bands is referred to as DC coefficient, an LP coefficient, and an HP coefficient, respectively. The frequency bands are generated after the PCT is applied twice. A transform equation employed in the PCT will be described later.

The HP coefficient is obtained by reordering coefficients obtained after performing the first stage 4×4 PCT in a block containing 4×4 pixels. After the reordering, an HP coefficient at the top left corner of each block is collected, so that 4×4 (sixteen in total) HP coefficients are collected from one macroblock. Then, the second stage 4×4 PCT is performed on those 4×4 HP coefficients and then the coefficients are reordered to obtain 4×4 LP coefficients. A coefficient at the top left corner of the 4×4 LP coefficients is extracted as a DC coefficient from each macroblock.

Through the above processes, three frequency bands are generated, so that a three-level resolution scalability can be obtained. In other words, the HP band having the same resolution as that of an original image, the LP band having one fourth resolution of that of the original image, and the DC band having one sixteenth resolution of that of the original image are obtained.

In the JPEG XR coding system, so-called Flex Bits is employed to assure two-level bit accuracy of the HP coefficients. The Flex Bits is similar to Layer in JPEG 2000.

The 4×4 PCT is performed through the following three stages (1) to (3), and a 4×4 Hadamard transform is performed on every four pixels between the stage (1) and the stage (2).
  (1) Hadamard transform stage
  (2) Rotation stage
  (3) Coefficient reordering stage FIGS. 4A and 4B are schematic diagrams for explaining processing in the coefficient reordering stage. FIG. 4A illustrates a 4×4 block containing 16 pixels in an area to be transformed, in which each pixel is represented by an English alphabet. FIG. 4B is a block containing 4×34 transform coefficients obtained after the coefficient reordering stage. In FIG. 4B, the pixels are assigned with the same English alphabet as those of the pixels contained in the block present before reordering is performed.

In the JPEG XR coding system, there is an option of performing, as preprocessing of the PCT, the POT that is a transform across the macroblock boundaries to prevent block noise. Three options are available when performing the POT: not to perform the POT at any stages; to perform the POT only before the first stage PCT; and to perform the POT before each of the first stage PCT and the second stage PCT.

When the POT is not performed at any stages, the frequency transform is performed independently with respect to each block, so that block distortion may occur when data is compressed at a high compression rate. If the POT has been performed, an inverse-POT needs to be performed when image data is decoded.

FIGS. 5 and 6A to 6E are schematic diagrams for explaining application of the POT. In the example shown in FIG. 5, the POT transform is performed on an area (POT block) covering four blocks (PCT blocks). Such a POT is referred to as a 4×4 POT.

Figure 6A:
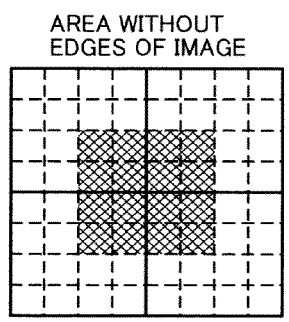
FIGS. 6A to 6E are schematic diagrams for explaining areas to which the POT is applied across tile boundaries.
Figure 6B:
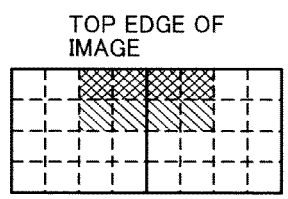
Figure 6D:
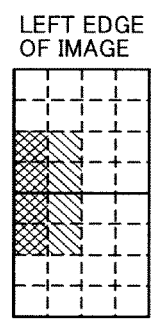
Figure 6E:
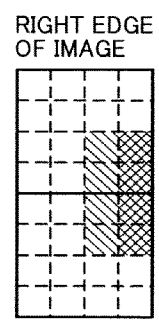
Figure 6C:
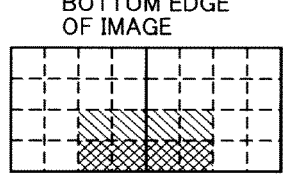

In the examples shown in FIGS. 6A to 6E, the POT is applied to areas that cross tile boundaries. FIG. 6A illustrates the POT performed on an area that does not contain an edge of an image. FIGS. 6B to 6E illustrate the POT performed on an edge of an image. In FIGS. 6B to 6E, pixels or transform coefficients used in the POT are indicated by hatched lines. Because neighboring blocks to be referred to are not present at the edges of the image, the overlap transform is performed by using pixels or transform coefficients indicated in FIGS. 6B to 6E. Such a POT is referred to as a 4×1 POT.

The 4×4 POT is performed through the following five stages:
  (1) Hadamard transform stage
  (2) Scaling stage
  (3) High-low/low-high rotation stage
  (4) High-high rotation stage
  (5) Hadamard transform stage In the JPEG XR coding system, predictive coding is performed before performing entropy coding on a subband coefficient. The transform coefficient obtained after Hadamard transform is also referred to as a subband coefficient. The predictive coding is performed on each subband of each of the DC band, the LP band, and the HP band, under a different prediction mode. The predictive coding is never performed across tile boundaries. In other words, prediction decoding can be performed on each tile completely independently.

Figure 7A:
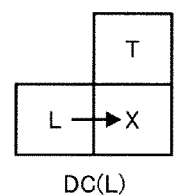
FIGS. 7A to 7D are schematic diagrams for explaining prediction modes for a DC coefficient.
Figure 7B:
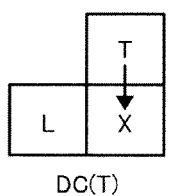
Figure 7C:
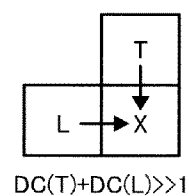
Figure 7D:
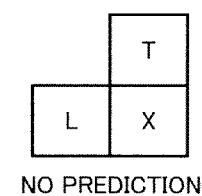

FIGS. 7A to 7D are schematic diagrams for explaining prediction modes for the DC coefficient. There are four prediction modes for the DC coefficient. FIG. 7A is a schematic diagram for explaining a prediction from a DC value of a macroblock on the left side. FIG. 7B is a schematic diagram for explaining a prediction from a macroblock on the top side. FIG. 7C is a schematic diagram for explaining a prediction from a value obtained by adding values of macroblocks on the left side and on the top side and dividing a resultant value by two. FIG. 7D is a schematic diagram for explaining a case where no prediction is performed. The case where no prediction is performed corresponds to a case where a prediction is performed based on a zero value.

As an example of a selection of the prediction mode, when a difference (absolute value) between a value to be predicted and a value to be used for the prediction is relatively small, the prediction modes shown in FIGS. 7A and 7B are preferable. For the rest cases, the prediction mode shown in FIG. 7C is preferable.

FIGS. 8A and 8B are schematic diagrams for explaining prediction modes for the LP coefficient. FIG. 8A is a schematic diagram for explaining an example of beginning a prediction from a macroblock on the left side. FIG. 8B is a schematic diagram for explaining an example of beginning a prediction from a macroblock on the top side. There is another prediction mode in which no prediction is performed. The prediction of the LP coefficient is performed only between macroblocks for which the same quantization parameters have been used. In other words, the prediction of the LP coefficient is not performed between macroblocks for which different quantization parameters have been used.

Regarding a prediction of the HP coefficient, unlike the DC coefficient and the LP coefficient, a single prediction mode is selected for all the blocks in a single macroblock. Three prediction modes are available for the HP coefficient: (1) to begin the prediction from a block on the left side; (2) to begin the prediction from a block on the top side; and (3) to not perform prediction.

In this manner, in the predictive coding in the JPEG XR coding system, the predictive coding is never performed across tile boundaries, so that decoding can be performed independently within a tile. Furthermore, the prediction of the DC coefficient and the LP coefficient is performed across macroblock boundaries, so that when a code is extracted in units of macroblocks, a value used for the prediction is needed.

After completion of the predictive coding, each of the subband coefficients is scanned in an adaptive scanning order. After completion of the coefficient scanning, run-length encoding is to be performed. Therefore, a scanning order is adaptively adjusted by counting the number of times of appearance of non-zero coefficient values so that non-zero coefficient values continue from the top of the order and zero-coefficient values are collected at the bottom of the order.

In the JPEG XR coding system, the entropy coding of the subband coefficients is implemented by combining the run-level coding for zero-coefficients and the adaptive variable length. If all coefficients in the subband are zero, the entropy coding is not performed and this situation is represented by a flag indicating that all the coefficients are zero.

A bitstream in the JPEG XR coding system is structured such that an index table indicating a header of an image and a position of a subband signal is set at the head of the bitstream, and subband signals follow the index table in units of tiles.

Two modes are available for the bitstream structure: Spatial mode and Frequency mode. A common feature of the two modes is that pieces of code data independent of each other with respect to each tile are aligned in series.

In the Spatial mode, pieces of code data are aligned in series with respect to each macroblock such that all frequency signals related to a macroblock 1 are aligned and all frequency signals related to a macroblock 2 are subsequently aligned. In the Frequency mode, unlike the Spatial mode, pieces of code data are aligned in series with respect to each frequency such that pieces of code data of all macroblocks at one frequency are aligned and pieces of code data of all macroblocks at a next frequency are subsequently aligned.

An image processing apparatus according to the embodiment is explained below. FIG. 9 is a schematic diagram illustrating a configuration example of an image processing apparatus 200 according to the embodiment. The image processing apparatus 200 reads information about a division of an unedited image code into tiles (i.e., tiling of an image), a parameter related to a frequency transform, or the like, and generates an edited image code by using both a partial code extracted from the unedited image code based on a result of editing and a code obtained by encoding an edited part of the image.

The image processing apparatus 200 includes an image-code extracting unit 210, an encoding unit 220, and a combining unit 230. The image-code extracting unit 210 outputs a code obtained by removing a partial code corresponding to an edited partial code from an unedited image code to the combining unit 230. The encoding unit 220 encodes an image corresponding to the edited partial code. The combining unit 230 combines the code output from the image-code extracting unit 210 and the code output from the encoding unit 220, and outputs an edited image code.

Figure 10:
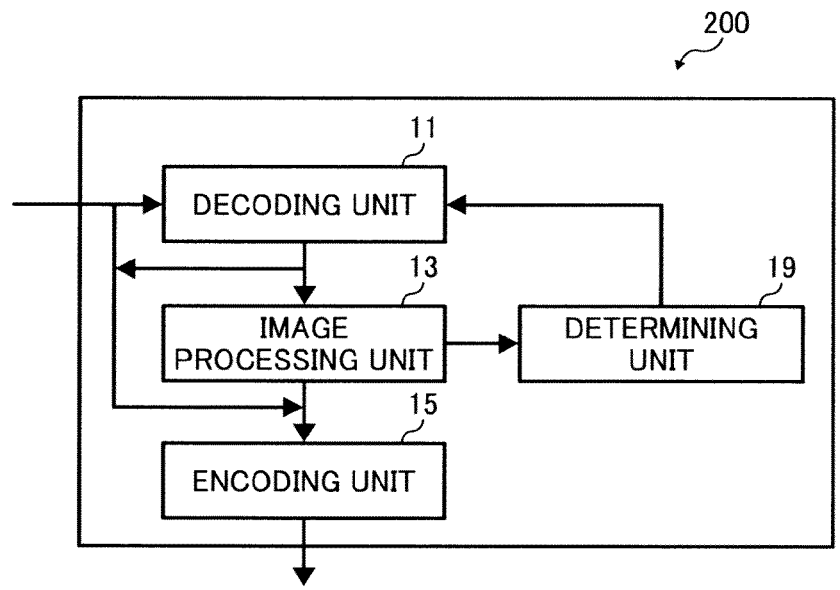
FIG. 10 is a block diagram of a functional configuration of the image processing apparatus shown in FIG. 9.

FIG. 10 is a block diagram of a functional configuration of the image processing apparatus 200. The image processing apparatus 200 includes a decoding unit 11, an image processing unit 13, an encoding unit 15, and a determining unit 19.

The decoding unit 11 extracts a partial code corresponding to a tile or the like to be edited from an input code data, and decodes the partial code.

The image processing unit 13 processes an image corresponding to the partial codes decoded by the decoding unit 11. The image processing unit 13 performs editing of the image according to an instruction from a user. The image processing unit 13 can be provided outside of the image processing apparatus 200.

The encoding unit 15 encodes the image corresponding to the partial code processed by the image processing unit 13. The encoding unit 15 removes a partial code corresponding to the edited partial code from the input code data, and adds the encoded partial code to the input code data. As a result, the partial code corresponding to the edited image is updated.

The determining unit 19 determines whether a pixel that has been processed through editing or the like among pixels contained in the image processed by the image processing unit 13 is referred to when an image corresponding to other partial code contained in the input code data is encoded.

The decoding unit 11 decodes the other partial code corresponding to the image that refers to the pixel in the input code data based on a determination result obtained from the determining unit 19. More particularly, when the determining unit 19 determines that the pixel that has been processed through editing or the like among the pixels contained in the image processed by the image processing unit 13 has been referred to when the other partial code is encoded, a partial image that refers to the pixel is newly decoded.

The encoding unit 15 encodes the image that has been newly decoded by the decoding unit 11 by referring to the image processed by the image processing unit 13. The encoding unit 15 generates new code data by replacing a corresponding partial code in the input code data with the partial code generated by being newly encoded.

Figure 11:
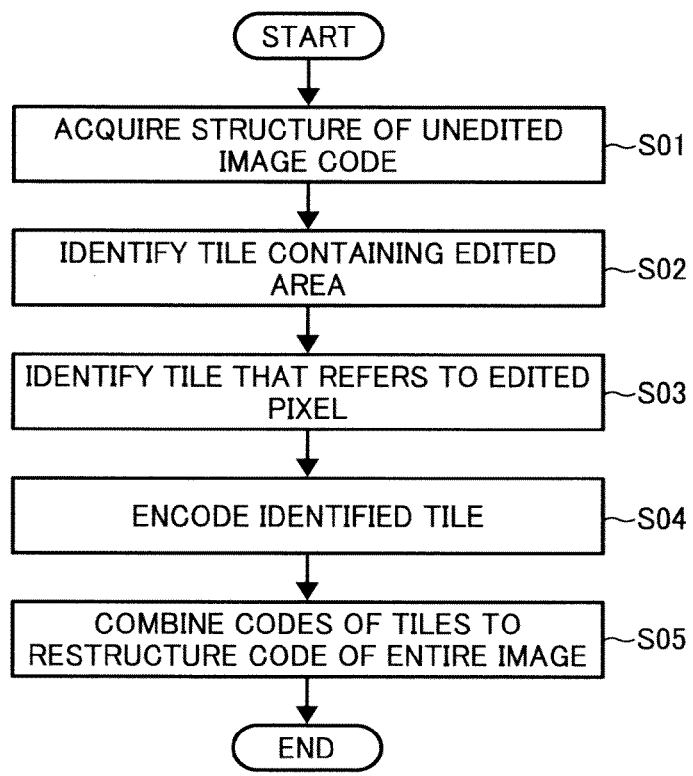
FIG. 11 is a flowchart of an image processing procedure according to the embodiment.

FIG. 11 is a flowchart of an image processing procedure according to the embodiment. In FIG. 11, assuming that a pixel in an edited tile is referred to by other tile, a process for re-encoding a code of the other tile that refers to the pixel is explained.

At Step S01 in FIG. 11, the determining unit 19 acquires a structure of unedited image code data. In the bitstream employed in the JPEG XR coding system, information related to the entire image is written in its image header. More particularly, the header of the bitstream contains information about presence of tiling, a flag indicating whether a code sequence order corresponds to the Frequency mode or the Spatial mode, information about presence of the index table, information about a level at which an over transform is performed, a color format of an input image, a bit accuracy of the input image, a size of each tile, information about a window corresponding to a margin at the top, at the bottom, on the left, and on the right with respect to the coordinates, and the like. The determining unit 19 reads these information pieces.

Figures 12, 13:
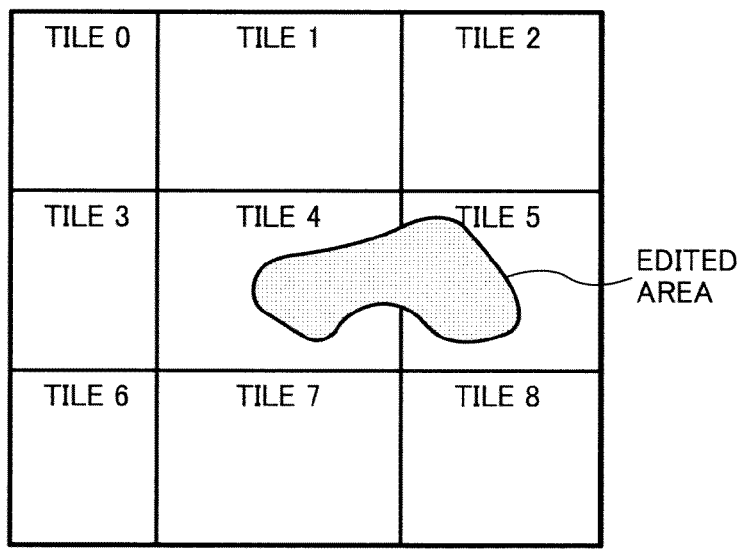
FIG. 12 is a schematic diagram of an image divided into tiles.
FIG. 13 is a schematic diagram for explaining a relation between an edited area and tiles.

FIG. 12 is a schematic diagram for explaining the tiling of an image. Tiles in the JPEG XR coding system need not have the same sizes over the entire image as long as the sizes of the tiles are uniform with respect to each row and each column. The tile numbers are assigned in a raster order.

Returning to FIG. 11, at Step S02 the determining unit 19 indentifies a tile containing an edited area based on the information about the structure of the image code data acquired at Step S01. Assume that an area indicated by hatched part in FIG. 13 has been edited, and that the edited area is in tiles 4 and 5. In this situation, in the subsequent step, code data corresponding to the tiles 4 and 5 is generated by encoding the edited image.

At Step S03, the determining unit 19 identifies a tile that refers to an edited pixel. The edited pixel means a pixel contained in the edited area. The edited pixel can be, for example, a pixel contained in the edited area and a pixel value of which is changed before and after editing.

Identification of the tile that refers to the edited pixel is performed in the following manner. That is, information is obtained about whether there is a tile that has been encoded by referring to an unedited pixel at a position corresponding to a position of the edited pixel within the tile containing the edited area, and, when such a tile exists, identification information of the tile is obtained. In other words, the tile needs to be re-encoded because the pixel to be referred to has been changed due to editing compared to when an original image is encoded.

At Step S04, the encoding unit 15 encodes the tile containing the edited area. After the decoding unit 11 acquires the tile that refers to the edited area from the image code data and decodes the tile, the encoding unit 15 encodes the decoded tile by referring to the tile containing the edited area.

At Step S05, the encoding unit 15 replaces corresponding code data contained in the image code data with the code data generated through encoding at Step S04. The encoding unit 15 can remove the corresponding code data contained in the image code data and add the code data generated at Step S04 to the bottom of the image code data instead of replacement of the code data.

Figure 14:
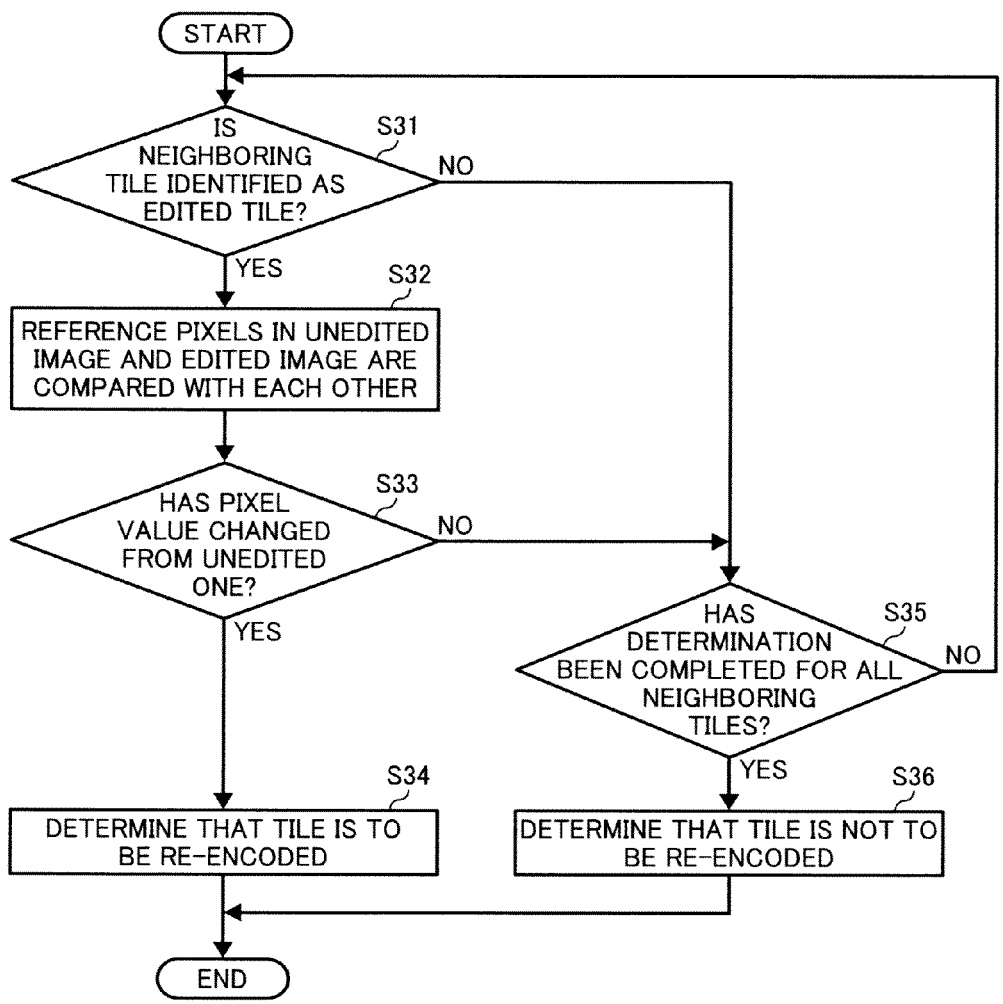
FIG. 14 is a flowchart of an exemplary procedure of a process for identifying a tile to be re-encoded.

FIG. 14 is a flowchart of an exemplary procedure of a process for identifying a tile to be re-encoded. The process shown in FIG. 14 is performed at Step S02 and Step S03 in FIG. 11.

At Step S31 in FIG. 14, it is determined whether a neighboring tile of each tile contained in the image has been identified as the tile containing the edited area at Step S02. When the neighboring tile contains the edited area, process control proceeds to Step S32. When the neighboring tile does not contain the edited area, process control proceeds to Step S35.

At Step S32, pixel values obtained before and after editing are compared to each other with respect to each pixel contained in the area to be referred to by other tiles. More particularly, it is determined, for example, whether a pixel value of a pixel to which the POT is applied in the JPEG coding system has been changed due to editing.

In the JPEG XR coding system, one tile is not completely independently encoded. The reason being that the POT is performed across boundaries between neighboring blocks within a tile or at tile boundaries.

Figure 15:
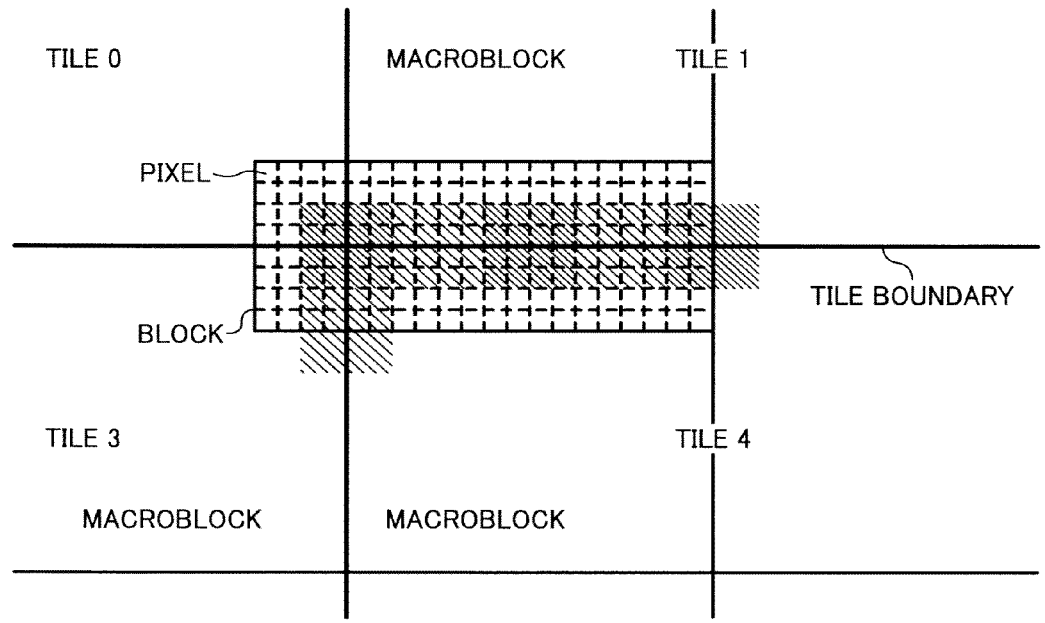
FIG. 15 is a schematic diagram for explaining pixel areas to be subjected to a POT before a first stage PCT.

FIG. 15 is a schematic diagram for explaining pixel areas to be subjected to the POT before performing the first stage PCT for calculating the HP coefficient. In FIG. 15, the POT is performed in an area of 4×4 pixels across block boundaries of four blocks formed of 4×4 pixels. A hatched portion in FIG. 15 corresponds to pixels to be subjected to the POT.

More particularly, in the first stage POT, a tile 1 in FIG. 15 refers to pixels contained in an area corresponding to four pixels at the right bottom corner in a tile 0, four pixels at the right upper corner in tile 3, and a two-pixel width at the top edge of a tile 4. In this situation, when the tile 4 is edited, pixel values obtained before and after editing are compared to each other for all pixels in the two-pixel width at the top edge of the tile 4.

Returning to FIG. 14, at Step S33, when the pixel values of a target pixel before and after editing are different from each other, process control proceeds to Step S34. On the other hand, when the pixel values of a target pixel before and after editing are the same to each other, process control proceeds to Step S35.

At Step S34, it is determined that the tile 1 is a target tile to be re-encoded, and then process control ends.

On the other hand, at Step S35, it is determined whether processes from Step S31 to Step S33 have been completed for all tiles adjacent to the tile 1. In this example, it is determined whether determination processes for the tile 0 and the tile 3, which are remaining tiles other than the tile 4, have been completed. When the determination processes have been completed, process control proceeds to Step S36. On the other hand, when the determination processes have not been completed, process control returns to Step S31 and the processes are repeated.

In the determination at Step S32 and Step S33, it is applicable to generate information indicating whether a pixel to be referred to (hereinafter, "reference pixel") is contained in the edited area when editing is performed, and determine whether the target pixel is edited by reference to the information, in addition to the comparison between the pixel values. For example, when an edited portion can be identified in advance as an area of a rectangular region or the like, it is possible to determine whether the area overlaps with an area of the reference pixel, so that comparison for all the pixel values need not be performed.

The tile that has been determined as a re-encoding target tile through the determination process shown in FIG. 14 is encoded at Step S04 in FIG. 11. On the other hand, as for the tile that has not been determined as the re-encoding target tile, a code of the tile from its offset identified by the index table in the unedited image code to an offset of a next tile is extracted as it is. A new image code is generated by combining the codes described above.

In the JPEG XR coding system, it is possible to perform the overlap transform for a plurality of number of times. More particularly, the following three modes are available when performing encoding:

1. to not perform overlap transform,
2. to perform overlap transform only before the first stage PCT, and
3. to perform overlap transform before the first stage and the second stage PCTs In the mode 1, in which the overlap transform is not performed, tiles other than a tile to be edited need not be re-encoded, so that it is sufficient to add an unedited tile code to a new image code.

In the mode 2, as described above, it is sufficient to determine whether two pixels from the tile boundary have been changed.

Figure 16:
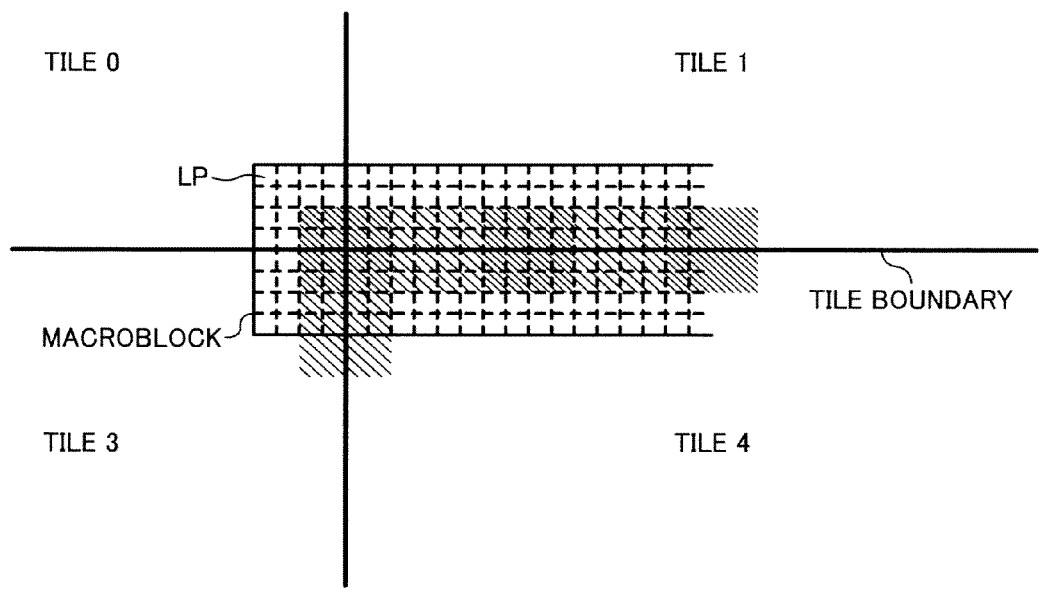
FIG. 16 is a schematic diagram for explaining a second stage POT.

In the mode 3, the POT is performed twice, so that a reference range from a neighboring tile increases. FIG. 16 is a schematic diagram for explaining the second stage POT performed by reference to two LP coefficients. In FIG. 16, the second stage POT is performed on 4×4 LP coefficients collected from among transform coefficients obtained by the first stage PCT, instead of the pixels. In other words, the two LP coefficients are referred to from a neighboring tile. The two LP coefficients correspond to four pixels in an image. Therefore, a pixel width to be subjected to the POT corresponds to eight pixels. Accordingly, if pixels in a four-pixel width from a tile boundary are not changed from unedited ones in all neighboring tiles, the tile need not be re-encoded.

In other words, in the JPEG XR coding system, information about an area of pixels to be referred to can be obtained based on the number of times of the POTs and the number of pixels or coefficients used in the first stage POT. More particularly, if the number of pixels or the coefficients used in the first stage POT is two, it is sufficient to determine whether as many pixels as the number corresponding to power of two (the number of times of the POTs) from the tile boundary have been edited.

A process for determining whether re-encoding is performed with respect to each macroblock is described below. In the JPEG XR coding system, the predictive coding performed in encoding is completely independently performed for each tile. However, the predictive coding is not independently performed between the macroblocks. More particularly, as described with reference to FIGS. 7A to 7D, 8A, and 8B, in some modes the prediction is performed across the macroblock boundaries for the DC coefficient and the LP coefficient.

Therefore, it is preferable to determine whether an unedited code has been encoded under the prediction mode for performing the predictive coding across the macroblock boundaries (hereinafter, this prediction mode is referred to as "cross-macroblock prediction mode"). If the cross-macroblock prediction mode is used, a target tile is re-encoded.

A case in which the cross-macroblock prediction mode is not used is described below. The case in which the cross-macroblock prediction mode is not used can be, for example, a case in which the prediction of the HP coefficient is performed between blocks within a macroblock. In this case, if the POT is performed, HP coefficients that refer to HP coefficients according to two pixels from the macroblock boundary also need to be updated. Therefore, it is preferable to re-encode the entire macroblock.

Figure 17:
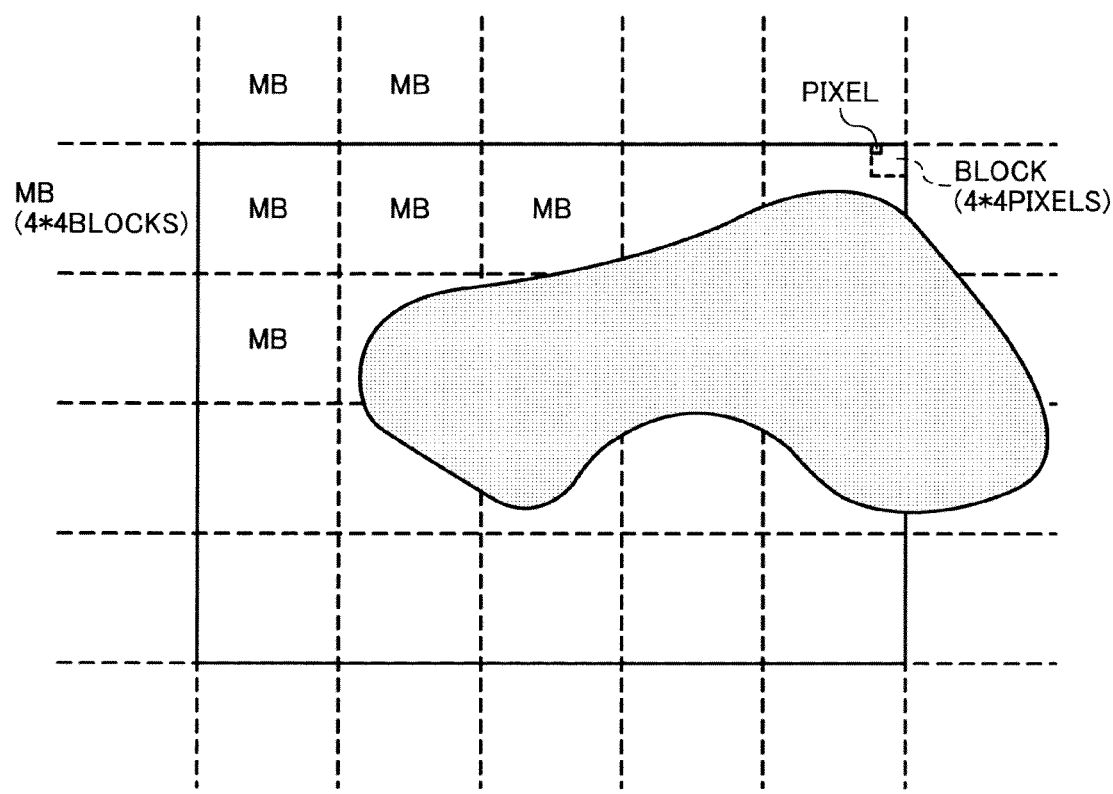
FIG. 17 is a schematic diagram for explaining a relation between an edited area and macroblocks.

FIG. 17 is a schematic diagram for explaining a relation between an edited area and macroblocks. The macroblocks containing the edited area are re-encoded.

An example in which the POT is performed at the first stage and encoding is performed in the Spatial mode is described below. If an edited pixel area does not overlap with a square area formed of 20×20 pixels ranging from a macroblock boundary of a macroblock to be examined, it is confirmed that pixel values to be referred to when encoding the macroblock has not been changed from unedited ones. Therefore, the macroblock is not re-encoded.

Regarding a macroblock that has been determined that it does not refer to the edited pixel, code data of the macroblock before editing is extracted and then added to the edited image code. On the other hand, regarding a macroblock that has been determined that it refers to the edited pixel, code data of the macroblock is re-encoded and then added to the edited image code. These codes are aligned in a raster order as a tile bitstream, and an image header and an index table are re-created, so that an image code in the Spatial mode can be obtained.

If pixels to be referred to in a tile to be examined or in all macroblocks contained in a target tile are not changed from unedited ones, even when the cross-macroblock prediction mode is used, a code data of the tile is not re-encoded and the code data is extracted from the unedited code and then added to a new image code. Furthermore, when the cross-macroblock prediction mode is not used, it is not necessary to extract a macroblock from an unedited code, so that a code data of the tile is extracted and then added to a new image code.

The image processing apparatus 200 can be realized by, for example, a personal computer (PC). The image processing method according to the embodiment can be realized by causing a central processing unit (CPU) to execute a computer program stored in a read only memory (ROM) or a hard disk drive by using a main memory such as a random access memory (PAM) as a work area.

While the preferable embodiment is described above, the present invention is not limited to the above embodiments. Any modifications can be made without departing from the scope of the present invention.

According to one aspect of the present invention, it is possible to provide an image processing apparatus, an image processing method, and a computer program product capable of reducing costs for decoding and re-encoding when processing a decoded image of code data generated by dividing image data into rectangular blocks and performing encoding with respect to each rectangular block.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that processes image code data of image data, the image code data containing a plurality of pieces of rectangular block code data each being generated as a result of dividing the image data into a plurality of rectangular blocks and performing encoding with respect to each rectangular block by reference to image data of a neighboring rectangular block of each of the rectangular blocks, the image processing apparatus comprising:

an encoding unit configured to encode a processed image that is obtained by performing image processing on a first decoded image that is obtained by decoding one of the pieces of the rectangular block code data;

a determining unit configured to determine whether a reference pixel has been subjected to the image processing, the reference pixel having been referred to among pixels contained in the first decoded image when image data of a rectangular block adjacent to the first decoded image has been subjected to the image processing; and a decoding unit configured to decode, when the determining unit determines that the reference pixel has been subjected to the image processing, a piece of the rectangular block code data of a rectangular block that has referred to the first decoded image thereby acquiring a second decoded image, wherein the encoding unit refers to, when the determining unit determines that the reference pixel has been subjected to the image processing, the processed image and encodes the second decoded image, the encoding unit performs an overlap transform across boundaries between one of the rectangular blocks and a neighboring rectangular block of the one of the rectangular blocks, and the reference pixel is used when performing the overlap transform.

2. The image processing apparatus according to claim 1, wherein the image code data contains overlap transform information indicating whether the overlap transform is performed when the image code data is generated, and the determining unit determines, when the overlap transform information indicates that the overlap transform is performed, whether the reference pixel is subjected to the image processing.

3. The image processing apparatus according to claim 1, wherein the determining unit acquires information about an area subjected to the overlap transform, and performs determination by identifying a pixel as the reference pixel among the pixels contained in the first decoded image based on the information.

4. The image processing apparatus according to claim 3, wherein the rectangular block code data contains a plurality of pieces of code data having hierarchical resolutions with respect to image data of each of the rectangular blocks, and the determining unit identifies a pixel as the reference pixel based on the information about the area subjected to the overlap transform with regard to one of the hierarchical resolutions, and a ratio between the hierarchical resolution subjected to the overlap transform and a resolution of the image data.

5. An image processing method for processing image code data of image data, the image code data containing a plurality of pieces of rectangular block code data each being generated by dividing the image data into a plurality of rectangular blocks and performing encoding with respect to each rectangular block with reference to image data of a neighboring rectangular block of each of the rectangular blocks, the image processing method comprising:

encoding, using a processor, a processed image that is obtained by performing image processing on a first decoded image that is obtained by decoding one of the pieces of the rectangular block code data;

determining whether a reference pixel has been subjected to the image processing, the reference pixel having been referred to among pixels contained in the first decoded image when image data of a rectangular block adjacent to the first decoded image has been subjected to the image processing; and decoding, when it is determined at the determining that the reference pixel has been subjected to the image processing, a piece of the rectangular block code data of a rectangular block that has referred to the first decoded image thereby acquiring a second decoded image, wherein the encoding includes referring, when it is determined at the determining that the reference pixel has been subjected to the image processing, the processed image and encoding the second decoded image, the encoding performs an overlap transform across boundaries between one of the rectangular blocks and a neighboring rectangular block of the one of the rectangular blocks, and the reference pixel is used when performing the overlap transform.

6. A non-transitory computer program product comprising a computer-usable medium having computer-readable program codes embodied in the medium that when executed cause a computer to execute the image processing method according to claim 5.

* * * * *